(12) United States Patent  
Tadic et al.

(10) Patent No.: US 6,332,718 B1
(45) Date of Patent: Dec. 25, 2001

(54) ROLLING BEARING WITH SEALS AND METHOD FOR ATTACHING SEALS TO A BEARING

(75) Inventors: Vedran Tadic, Tours (FR); Manfred Brandenstein, Eussenhein (DE); Johannes Franciscus Van De Sanden, Nieuwegein (NL)

(73) Assignee: SKF France, Clamart (FR)

( * ) Notice: Subject to any disclaimer, the term of this patent is extended or adjusted under 35 U.S.C. 154(b) by 0 days.

(21) Appl. No.: 09/521,202

(22) Filed: Mar. 7, 2000

(30) Foreign Application Priority Data

Mar. 8, 1999 (FR) .................................................. 99 02828

(51) Int. Cl.[7] ..................................................... F16C 33/78
(52) U.S. Cl. ........................ 384/477; 384/484; 29/898.11
(58) Field of Search ................................. 384/477, 484, 384/486, 488; 29/898.11

(56) References Cited

U.S. PATENT DOCUMENTS 3,627,391   12/1971   Bingle .
4,578,848   4/1986   Dickson .
4,632,401   12/1986   Kar et al. ................................. 277/1
5,862,592   1/1999   Harimoto et al. .

FOREIGN PATENT DOCUMENTS 2 261 459       2/1974    (FR) .
1342239         1/1974    (GB) .
2000-291786     10/2000   (JP) .
WO 98/34053     8/1998    (WO) .

*Primary Examiner*—Lenard A. Footland
(74) *Attorney, Agent, or Firm*—Smith, Gambrell & Russell, LLP

(57) ABSTRACT

A rolling bearing device comprises an outer ring 105 provided with an internal raceway 106 formed on its bore, an inner ring 101 provided with an external raceway 102 formed on its cylindrical exterior surface, at least one row of rolling bodies 111 arranged between the two raceways 102, 106 and at least one sealing member 121 secured to one of the rings. The sealing member 121 comprises an annular metal reinforcement 123. The device comprises a part 126 for connecting between the reinforcement 123 and the ring which supports it, the connecting part 126 being formed by a filler metal which, after melting and cooling, provides attachment, sealing and molds to the shapes of the said reinforcement and the said ring.

18 Claims, 5 Drawing Sheets

ROLLING BEARING WITH SEALS AND METHOD FOR ATTACHING SEALS TO A BEARING

The present invention relates to the field of rolling bearings, for example ball, roller or needle bearings, etc., equipped with at least one sealing member mounted on one of the rings of the bearing, preferably the outer ring.

The bearing is lubricated using grease packed inside the said bearing before the seals are fitted. The sealing members are intended, on the one hand, to hold the lubricant inside the bearing and, on the other hand, to prevent contaminants from entering the bearing. The outer ring of the bearing has two lateral annular grooves, in each of which a sealing member is mounted. The sealing member may be in the form of a seal or a cheek. The seal is made up of a disc-shaped annular metal reinforcement intended to give it sufficient rigidity. Overmoulded onto this reinforcement is an elastic material (rubber, nitrile, etc.) which provides:

a static seal with the ring on which the seal is fixed in the form of an annular bulge projecting radially from the periphery of the reinforcement, a dynamic seal with the other ring of the bearing, in the form of an annular lip which rubs against the said other ring.

A seal of this kind is force-fitted into the groove, the elastic material thus being prestressed inside the groove and at the same time centring and holding the seal in the groove while also providing a static seal.

The cheek is a simple metal washer fixed by some appropriate means to the outer ring of the bearing. It is possible, for example, to crimp the periphery of the cheek into an annular groove in the outer ring of the bearing.

The static seal is achieved at the region where the cheek is crimped to the outer ring.

The dynamic seal is achieved in this case without friction by the narrow passage formed between the cheek and the other ring of the bearing.

In this case, the metal reinforcement and the cheek are just one and the same part.

While such seals are satisfactory in most cases, there are applications in which the inner ring is stationary and the outer ring rotates at high speed. The grease is thus centrifuged towards the outside and the resulting pressure tends to cause it to seep through the static seal as grease gradually makes it way between the groove in the outer ring and the periphery of the seal or of the cheek. This phenomenon is aggravated when the bearing operates at a high temperature. The grease then becomes more fluid, and this further encourages leaks through the static seal.

What is more, in the case of the use of a seal, gradual ageing of the elastic material causes it to harden. This phenomenon is an additional cause of lubricant leakage at the static seal. The result of these leaks is that the amount of grease present inside the bearing, that is to say radially between the rings and axially between the seals gradually decreases and the bearing experiences premature failure through lack of lubrication.

This type of problem is encountered, for example, in bearings used in motor vehicle combustion engine belt tensioner rollers.

The outer ring of the bearing rotates at high speed because of the small diameter of the roller and the unit as a whole operates in a hot and confined space.

The object of the invention is to overcome this problem.

The object of the invention is to propose a rolling bearing with an extended life and better lubrication.

The rolling bearing device according to the invention is of the type comprising an outer ring provided with an internal raceway formed on its bore, and at least one groove also formed on its bore and adjacent to a radial face, an inner ring provided with an external raceway formed on its cylindrical exterior surface, at least one row of rolling bodies arranged between the two raceways and at least one sealing member secured to one of the rings. The sealing member comprises an annular metal reinforcement. The device comprises a part for connecting between the reinforcement and the ring which supports it, the connecting part being formed by a filler metal which, after melting and cooling, provides attachment and sealing by moulding to the shapes of the said reinforcement and the said ring. The connecting part is placed in the said groove.

Thus, the reinforcement is secured to the ring by moulding to, and interference of, shapes and not only by the adhesion of the weld. In other words, the connecting part acts like a key or wedge between the reinforcement and the ring. The said groove is of the type which is standard in bearings intended to take seals, and this means that no additional cost is involved.

Advantageously, the reinforcement is in contact with the said groove.

The filler metal may be based on tin, silver or a silver and tin alloy.

Advantageously, the connecting part is formed in an annular groove of the said ring.

The sealing member may comprise just a metal cheek which makes a narrow passage with the other ring, or an annular flexible lip capable of coming into rubbing contact with the other ring.

Another object of the present invention is a method for attaching a sealing member to a rolling bearing ring, of the type comprising an outer ring provided with an internal raceway formed on its bore, and at least one groove also formed on its bore and adjacent to a radial face, an inner ring provided with an external raceway formed on its cylindrical exterior surface, at least one row of rolling bodies arranged between the two raceways, and at least one sealing member secured to one of the rings. The sealing member comprises a rigid metal reinforcement and a flexible lip capable of coming into rubbing contact with the other ring. The said method comprises the formation of a connecting part by melting and cooling a filler metal placed between the reinforcement and the ring which supports it.

In one embodiment of the invention, the filler metal is placed on one edge of the reinforcement, the sealing member is placed on the said ring, the filler metal is heated until it melts, the filler metal spreading between the reinforcement and the said ring, then cooling. The filler metal may be arranged in the form of a coating on the periphery of the reinforcement.

In another embodiment of the invention, with the filler metal in the form of a rod, an appropriate length of rod is cut, the rod and then the sealing member are placed on the said ring, the filler metal is heated until it melts, the filler metal spreading between the reinforcement and the said ring, then cooling. The filler metal may also be in the form of a continuous annulus.

The means for heating the filler metal may be a laser beam or an electron beam.

This then yields a seal-attachment method which is economical and suited to mass production while at the same time allowing a reduction in the amount of elastic material used in so far as this elastic material no longer covers the entire reinforcement but simply forms the sealing lip and a part which has sufficient surface area that it can be fixed conveniently, for example by overmoulding, onto the reinforcement.

The method makes it possible to obtain an extremely effective static seal which does not age in time between the reinforcement of the sealing member and the ring which supports it.

The present invention will be better understood and other advantages will become clear from reading the detailed description of a number of embodiments which are taken by way of non-limiting examples and illustrated by the appended drawings, in which.

Figure 1:
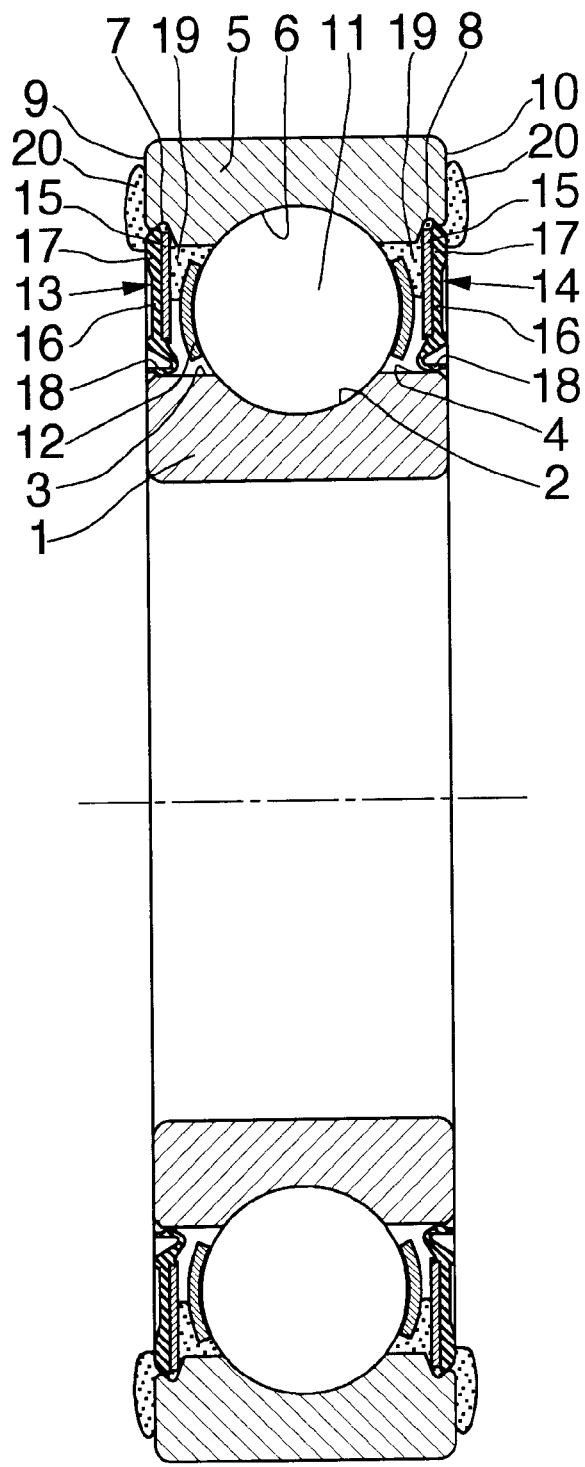
FIG. 1 is a view in axial section of a rolling bearing according to the prior art.
Figure 2:
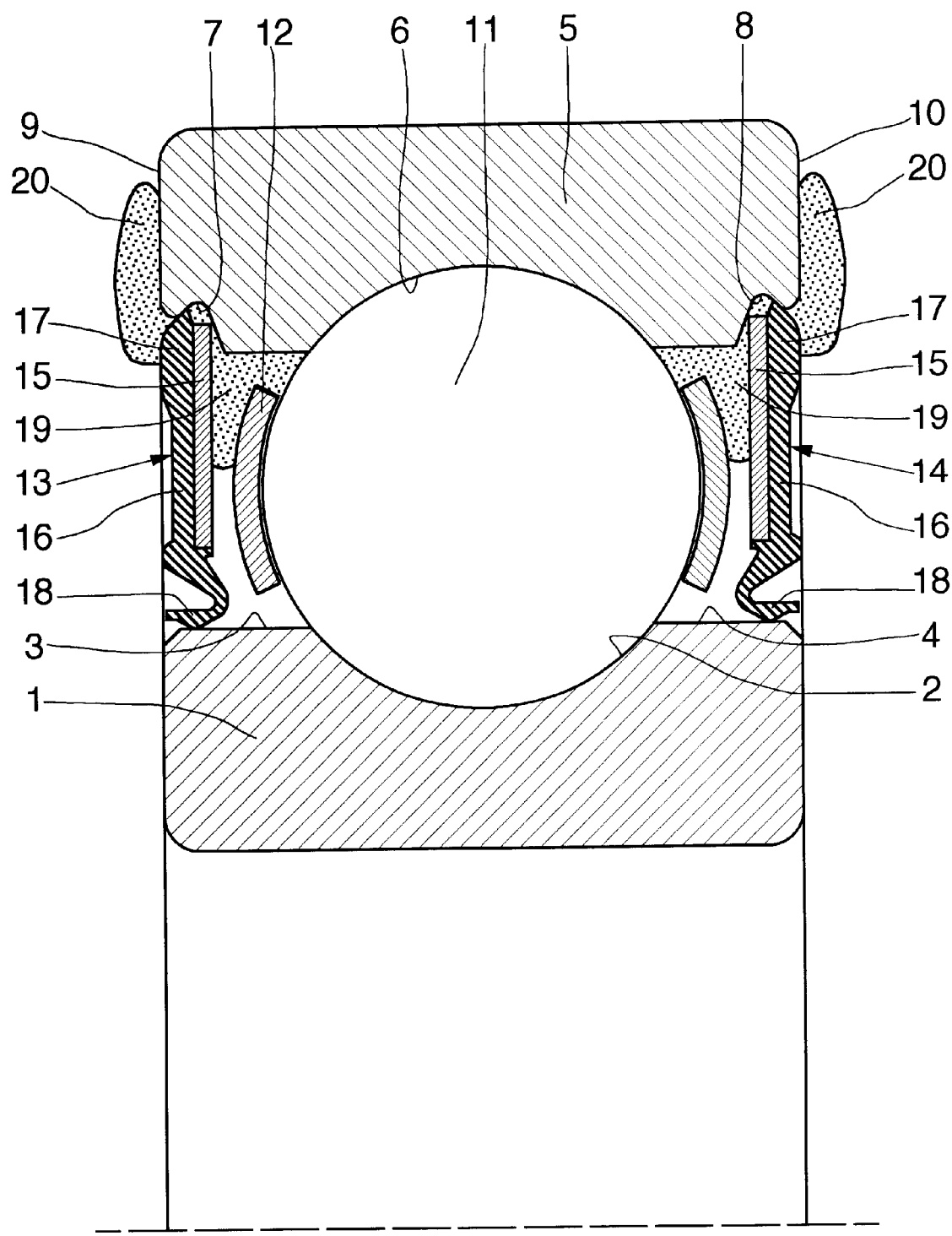
FIG. 2 is an enlarged part view of FIG. 1.

As can be seen in FIGS. 1 and 2, a conventional rolling bearing comprises a stationary inner ring 1 provided with an external raceway 2 and two exterior cylindrical surfaces 3 and 4 arranged axially one on each side of the raceway 2, a rotating outer ring 5 provided with an internal raceway 6 and two grooves 7 and 8 formed radially towards the outside and adjacent to the radial faces 9 and 10 of the outer ring 5 which form its axial ends, and a row of rolling bodies 11, in this case balls, arranged between the raceways 2 and 6. The uniform circumferential spacing of the rolling bodies 11 is provided by a sheet metal cage 12. Two sealing members 13 and 14 are fixed to the outer ring 5. As the sealing members 13 and 14 are identical and mounted symmetrically with respect to a radial plane passing through the centre of the rolling bodies 11, only the sealing member 13 will be described.

The sealing member 13 comprises a disc-shaped radial metal reinforcement 15 extending from the groove 7 towards the exterior surface 3 of the inner ring 1. Overmoulded onto that face of the reinforcement 15 which faces away from the rolling bodies 11 is a part 16 made of elastomer, the outer radial end 17 of which forms a bulge which extends radially into the groove 7. This bulge 17 is force-fitted at the time of mounting and positions itself in the groove 7. The inner radial end of the elastomer part 15 forms a lip 18 which comes into rubbing contact with the exterior surface 3 of the inner ring 1.

Prior to mounting the sealing members 13 and 14, a certain amount of grease 19, intended to lubricate the bearing, will have been packed inside the bearing between the rings 1 and 5. During operation, the reinforcement 15 provides the sealing member 13 with a certain rigidity and prevents it from deforming.

However, the rotation of the outer ring 5, particularly at high speed, means that the grease 19 accumulates on the interior surface of the outer ring 5, as a result of centrifuging. The grease 19 tends to escape by leaking between the groove 7 and the sealing member 13, in spite of the contact between the reinforcement 15 and the edge of the groove 7 on the same side as the rolling bodies and the contact between the elastomer bulge 17 and the edge of the groove 7, on the same side as the front surface 9.

As a result, some 20 of the grease manages to escape from inside the bearing and runs along the front surface 9. The bearing gradually empties all the grease it originally contains until such time as this lack of lubrication causes it to overheat and causes premature wear of the components of which it is made.

In the next figures, the references of elements which are similar to those of FIGS. 1 and 2 have been increased by the number 100.

Figure 3:
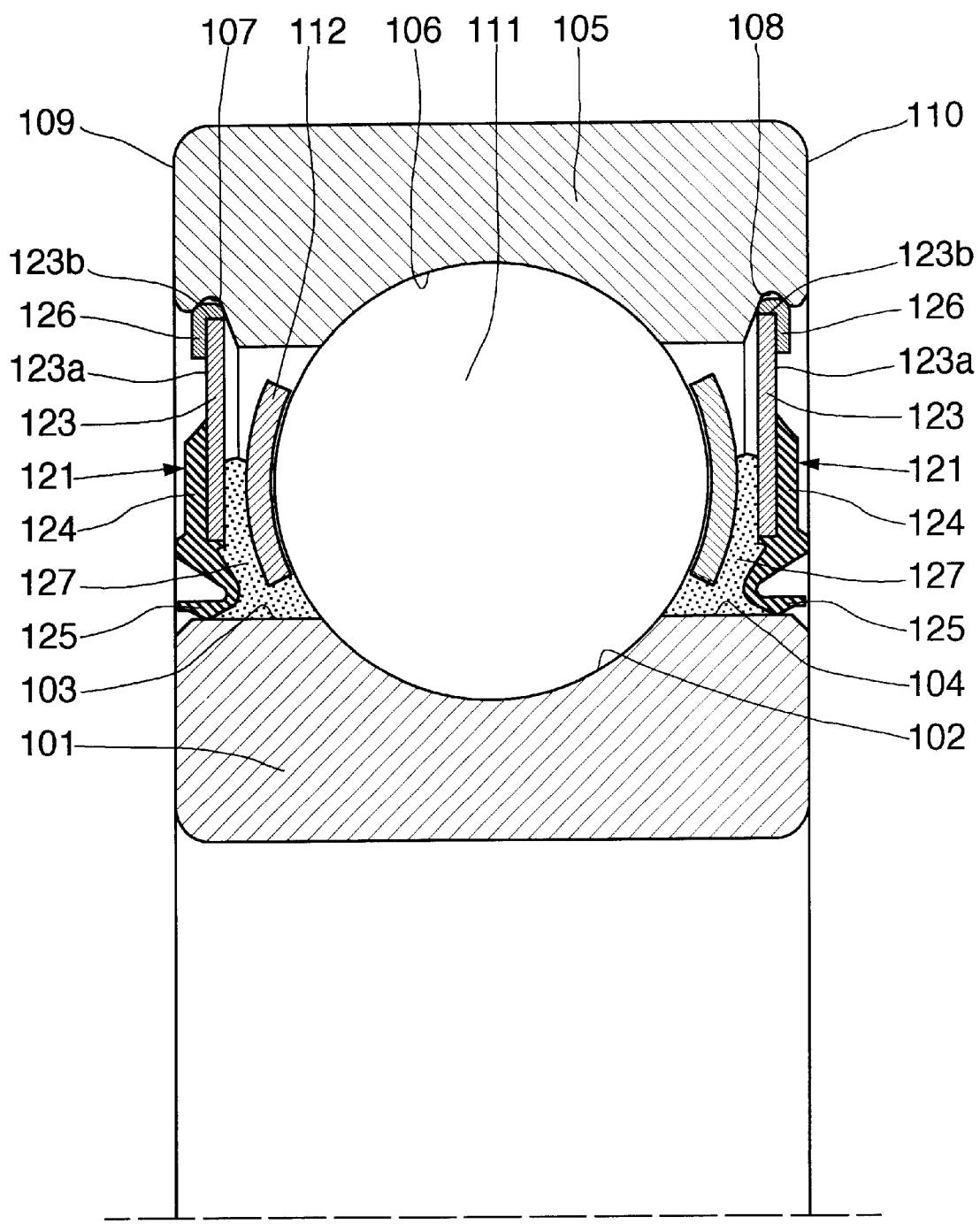
FIG. 3 is a half view in axial section of a rolling bearing according to a first embodiment of the invention, before the seal is permanently attached.
Figure 4:
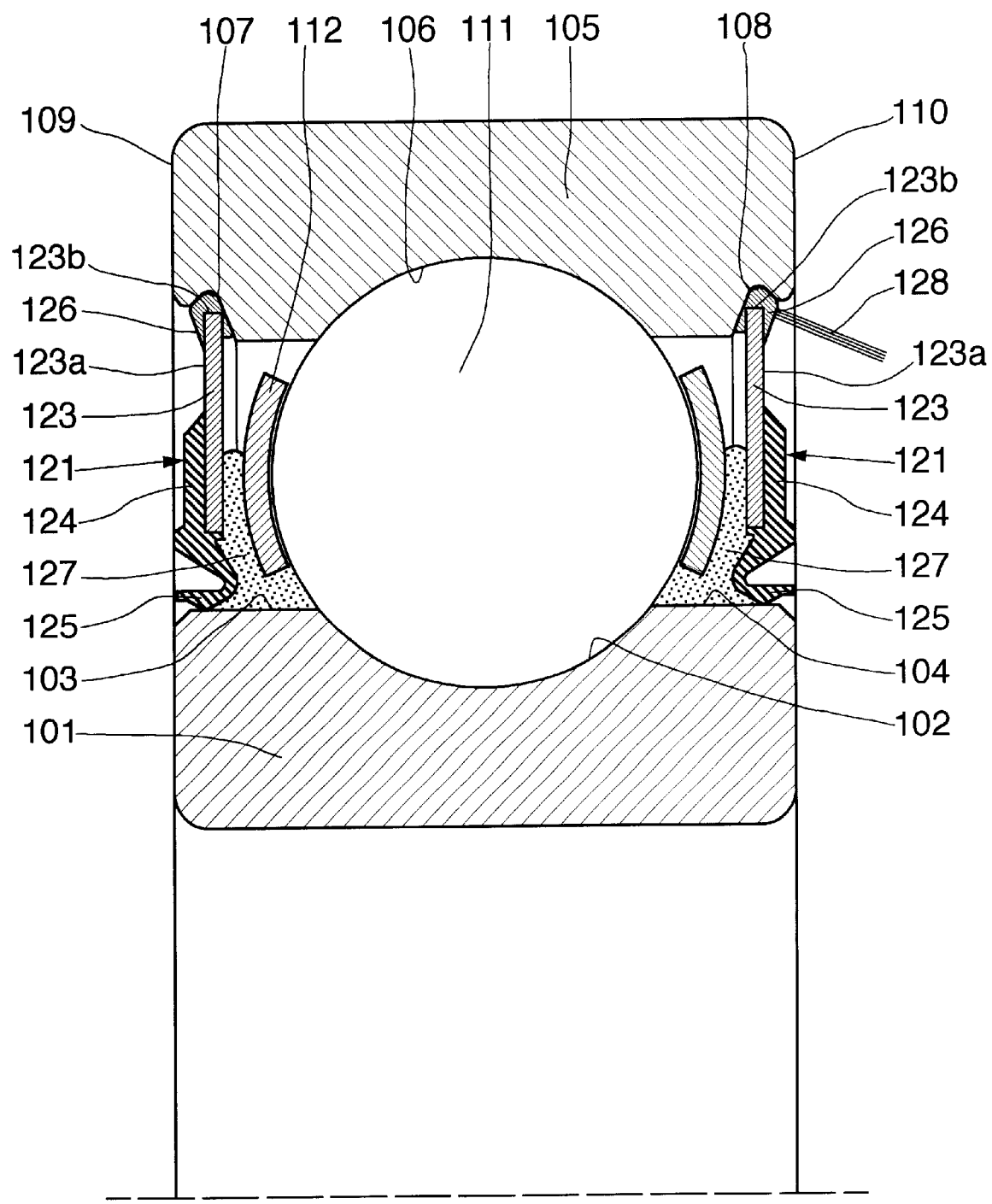
FIG. 4 is a view corresponding to FIG. 3 after the seal has been permanently attached.

As can be seen in FIGS. 3 and 4, the sealing member 121 comprises a disc-shaped radial metal reinforcement 123 provided with an outer surface 123a and an outer edge 123b, and an elastomer part 124 covering only part of the surface 123a, for example about half of this surface, and ending radially on the inside in a sealing lip 125. The reinforcement 123 is partially covered with a filler metal in the form of an annulus 126 of L-shaped cross section which is fixed to the outer edge 123b and to a small part of the outer surface 123a adjacent to the end 123b. The annulus 126 thus comprises a short axial portion the thickness of which is approximately equal to that of the edge 123b and a radial portion in contact with the outer surface 123a. The annulus 126 is made of metal or metal alloy, with a fairly low melting point, and the melting of which requires only a small amount of energy to be supplied, so it requires only a short heating time.

A certain amount of grease 127 is packed inside the bearing prior to the fitting of the seals 121 and 122. The grease 127 is packed near the inner ring 101 so that it does not contaminate the grooves 107 and 108. The seals 121 and 122 are then fitted, by offering them up in an axial movement, the annulus 126 coming into contact with the groove 107 and the lip 125 coming into contact with the external cylindrical surface 103 of the inner ring 101.

As can be seen in FIG. 4, the annulus 126 is then melted by localized heating obtained using a laser beam 128 or an electron beam aimed at the said annulus 126. In an extremely short space of time, the metal of which the annulus 126 is composed melts and then spreads into the groove 107 or 108, occupying the bottom of the said grooves 107, 108 and their inner edge, on the same side as the rolling bodies 111. As it cools, the metal both attaches the reinforcement 123 and the said outer ring 105 of the bearing and provides a perfect static seal between the said reinforcement 123 and the said outer ring 105. Unlike the case with rubber, there is no problem of the ageing of the material when using a filler metal such as a tin-based metal which maintains its properties over time. The metal could also be based on silver.

As the filler metal is melted at a relatively low temperature, for example a temperature of between 180° C. and 200° C. in the case of a tin-based metal, and requires a very short amount of time, there is no risk that the heat given off might adversely affect the properties of the outer ring 105 of the bearing which has undergone a heat treatment, for example hardening.

Specifically, as the groove 107, 108 supporting the sealing members 121, 122 is located a short distance from the raceway 106, excessive heating in terms of temperature and/or in terms of time could cause local alterations to the structure of the steel, accompanied by a reduction in hardness and could also cause possible deformation with consequences that would be detrimental to the subsequent correct operation of the bearing. The fact that the grease 127 is packed in near to the inner ring 101, prevents the grooves 107, 108 of the outer ring 105 from being contaminated before the filler metal has been melted.

Figure 5:
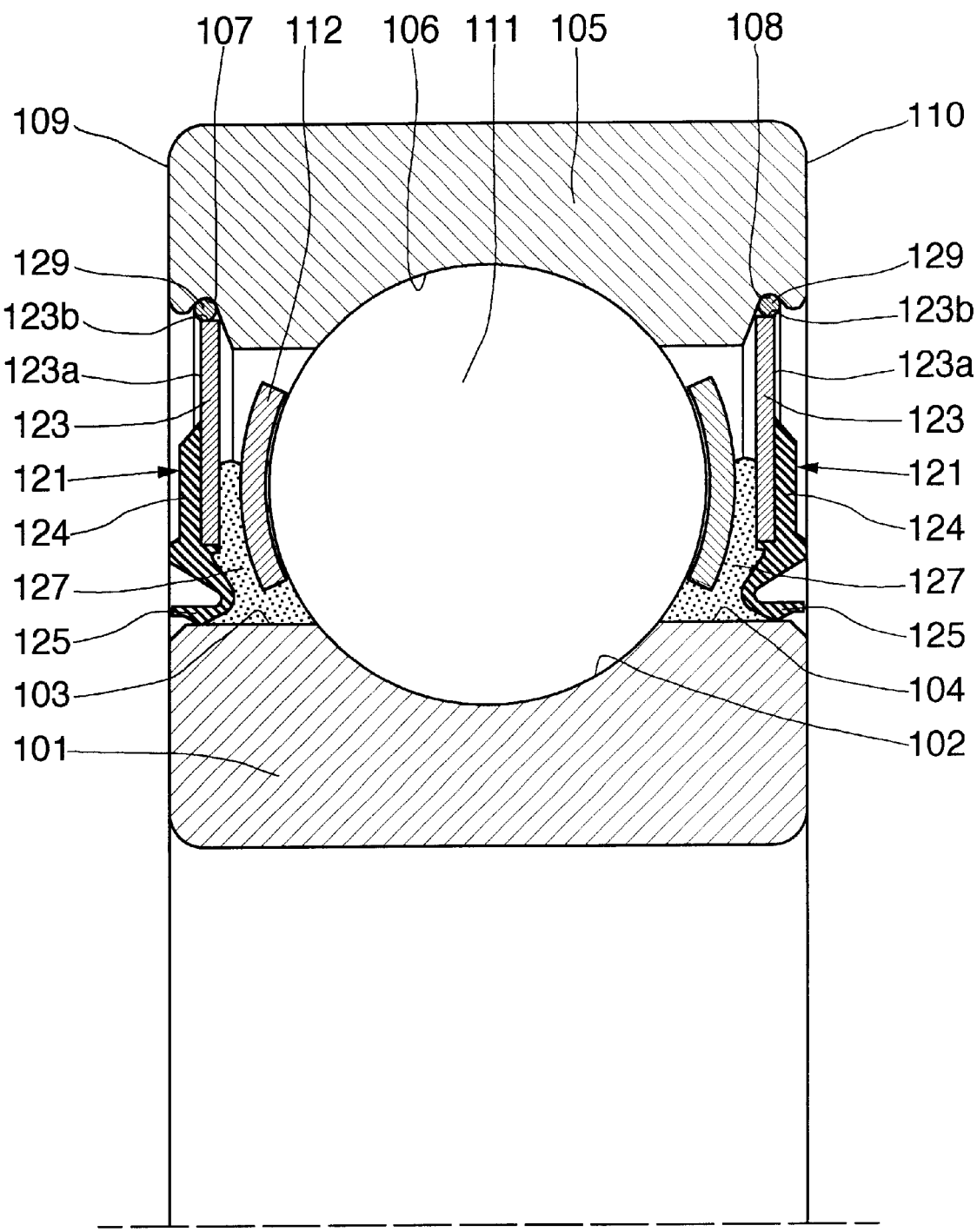
FIG. 5 is a half view in axial section of a rolling bearing according to another embodiment of the invention.

FIG. 5 illustrates an alternative form of the invention which is to be compared with FIG. 3. In place of the L-section annulus 126 of FIG. 4, a simple O-section annulus 128 is placed in the bottom of each groove 107, 108, these rings 128 being made of the same metal or alloy as the annulus 126 in FIG. 3.

In this embodiment, the filler metal may be in the form of a wire cut to the desired length and coiled on itself to form an annulus fitted into the grooves 107, 108 in the outer ring 105 before or after the seals 121 and 122 are fitted. It would also be possible to provide the filler metal in the form of a continuous annulus.

Once the annuli 128 and the seals 121 and 122 have been fitted, the rod of filler metal is heated to form the weld.

The annulus of filler metal could also be fitted after the seal has been fitted against the face of the reinforcement and at the mouth of the groove instead of being arranged as before in the bottom of the groove. The spreading into the bottom of the groove then occurs as the filler metal is melted.

By way of an alternative, it would also be possible to provide grooves 107, 108 of different shapes, for examples grooves forming a shoulder in the radial surfaces of the outer ring.

Of course the invention applies to any type of rolling bearing with one or more rows of rolling bodies, with a one-piece outer or inner ring or a ring made of several parts, with a rotating outer or inner ring, etc.

What is claimed is:

1. Rolling bearing device of the type comprising an outer ring provided with an internal raceway formed on its bore, and at least one groove also formed on its bore and adjacent to a radial face, an inner ring provided with an external raceway formed on its cylindrical exterior surface, at least one row of rolling bodies arranged between the two raceways, at least one sealing member secured to one of the rings, the sealing member comprising an annular metal reinforcement, and a part for connecting between the reinforcement and the ring which supports it, the connecting part being formed by a filler metal which, after melting and cooling, provides attachment and sealing by moulding to the shapes of the said reinforcement and the said ring, and wherein the connecting part is placed in the said groove.

2. Device according to claim 1, wherein the reinforcement is in contact with the said groove.

3. Device according to claim 1, wherein the filler metal is based on silver, tin or a silver and tin alloy.

4. Device according to claim 1, wherein the connecting part is formed in an annular groove of the said ring.

5. Device according to claim 1, wherein the sealing member is a seal which has at least one flexible annular lip capable of coming into rubbing contact with the other ring.

6. Device according to claim 1 wherein the sealing member is an annular metal cheek which makes a narrow passage with the other ring.

7. Method for attaching the sealing member to said rolling bearing device of claim 1, comprising forming a connecting part by melting and cooling a filler metal placed between the reinforcement and the ring which supports it, the connecting part being placed in the said groove.

8. Method according to claim 7, in which the filler metal is placed on one edge of the reinforcement, the sealing member is placed on the said ring, the filler metal is heated until it melts, the filler metal spreading between the reinforcement and the said ring, then cooling.

9. Method according to claim 8, in which the filler metal is arranged in the form of a coating on the periphery of the reinforcement.

10. Method according to claim 7, in which, with the filler metal in the form of a rod, an appropriate length of rod is cut, the rod and the sealing member are placed on the said ring, the filler metal is heated until it melts, the filler metal spreading between the reinforcement and the said ring, then cooling.

11. Method according to claim 7, in which, with the filler metal in the form of a continuous annulus, the annulus and the sealing member are placed on the said ring, the filler metal is heated until it melts, the filler metal spreading between the reinforcement and the said ring, then cooling.

12. Method according to claim 7, in which the means for heating the filler metal is a laser beam.

13. Method according to claims 7, in which the means for heating the filler metal is an electron beam.

14. Method according to claim 7 further comprising providing the sealing member with a flexible lip capable of coming into rubbing contact with the other ring.

15. Method according to claim 7, wherein the connecting part is placed in said groove through a flow of the filler metal into said groove.

16. Method according to claim 15, wherein the flow of the filler metal is from a mouth of the groove to a bottom of the groove.

17. Device according to claim 1, wherein said connecting part is formed from an annulus having an L-shaped cross-section and positioned on an outer edge of said reinforcement.

18. Device according to claim 1, wherein said connecting part is formed from an O-section annulus positioned within the groove.

* * * * *